(12) United States Patent
Takahashi et al.

(10) Patent No.: US 6,552,869 B1
(45) Date of Patent: Apr. 22, 2003

(54) MAGNETIC STORAGE CARD

(75) Inventors: Shoji Takahashi, Hanno (JP); Katsuhiko Fujinuma, Higashikurume (JP); Tomoshige Inuyama, Hino (JP); Maki Wakita, Sayama (JP); Katsutoshi Mukaijima, Higashikurume (JP); Akinobu Iwako, Iruma (JP)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/762,828

(22) PCT Filed: Jun. 13, 2000

(86) PCT No.: PCT/JP00/03837

§ 371 (c)(1),
(2), (4) Date: May 29, 2001

(87) PCT Pub. No.: WO00/77789

PCT Pub. Date: Dec. 21, 2000

(30) Foreign Application Priority Data

| Jun. 14, 1999 | (JP) | 11-166492 |
| Jun. 14, 1999 | (JP) | 11-166493 |
| Jun. 15, 1999 | (JP) | 11-168452 |

(51) Int. Cl.⁷ ............................................. G11B 17/00
(52) U.S. Cl. ................................................. 360/97.01
(58) Field of Search .......................... 360/97.01–97.04

(56) References Cited

U.S. PATENT DOCUMENTS

| 5,502,604 A | 3/1996 | Furay ..................... 360/97.01 |
| 5,841,606 A * | 11/1998 | Shimazu et al. ......... 360/97.01 |
| 5,875,074 A * | 2/1999 | Ho et al. |
| 5,898,537 A | 4/1999 | Oizumi et al. ........... 360/97.01 |
| 5,995,332 A * | 11/1999 | Patterson |
| 6,320,723 B1 * | 11/2001 | Bernett .................... 360/97.02 |
| 6,411,463 B1 * | 6/2002 | Janik et al. .............. 360/97.01 |
| 6,429,999 B1 * | 8/2002 | Dague et al. ............ 360/97.01 |

FOREIGN PATENT DOCUMENTS

| EP | 0 721 187 A2 | 7/1996 |
| JP | 2-2066 Y2 | 1/1990 |
| JP | 05062477 A | 3/1993 |
| JP | 8-502848 | 3/1996 |
| JP | 8-235719 | 9/1996 |
| JP | 9-265771 | 10/1997 |
| WO | 94/09486 | 4/1994 |

\* cited by examiner

Primary Examiner—Allen Cao
(74) Attorney, Agent, or Firm—Woodcock Washburn LLP

(57) ABSTRACT

When a lower head (34b) mounted on a lower head arm (32b) is in a standby position permitting no access to a magnetic recording disk (13), the lower head arm (32b) is housed in an opening (37) formed in a frame plate (3). Thus, the lower head arm (32b) and another (upper) head arm (32a) may maintain a predetermined distance even in a card-type magnetic recording device of small thickness. An electromagnetic shield material is adhered to the opening to protect the heads 34 (34a, 34b).

11 Claims, 9 Drawing Sheets

MAGNETIC STORAGE CARD

TECHNICAL FIELD

This invention relates to a card-type magnetic recording device, which is mounted to a portable computer for input or output of information to or from the computer.

BACKGROUND ART

Insertion of a card-type magnetic recording device in the shape of a PC card into a slot of a portable computer for supply of information from the magnetic recording device to the computer or vice versa permits the computer to increase a processing data capacity and also to provide additional functions.

In such a card-type magnetic recording device, a case body is generally composed of a frame, a frame plate formed together with the frame in one united body and upper and lower covers for covering the upside and the underside of the frame plate.

In addition to the frame plate, a circuit substrate mounted with elements on one surface is housed in the case body in the state of overlap with the frame plate. A space for housing a cartridge formed by housing a disk-shaped recording medium (which will be hereinafter referred to as a disk) in a shell is formed in the case body.

Further, various components such as a recording/reproducing head body for reading and writing information from and to the disk, a drive device for swinging a head arm of the recording/reproducing head body, a drive device (a motor) for revolving the disk, a lock means for holding the disk in the case and an ejector mechanism for ejecting the disk toward the outside of the case are mounted on one surface (the surface on the side of the circuit substrate) of the frame plate.

Most card-type recording devices in general use have dimensions based on PCMCIA standard Type II. According to this standard, dimensions of the case body of the card-type recording device are regulated to be 54.0 mm in width, 85.0 mm in length and 5.0 mm in thickness.

Thus, a considerable contrivance is required for housing the frame plate mounted with various components for recording/reproduction and revolution of the disk on one surface, together with the circuit substrate or the like mounted with the elements on one surface, in the case body having such a narrow space (a small thickness in particular), while securing a cartridge housing space in the case body.

Further, when the head is not in a disk access position, in other words, the head is placed in a standby position without reading or writing information from or to the disk, the head (and the head arm which carries the head) is placed distant from the disk in the radial direction of the disk, and moreover, the head is placed in a location further above the upside of the disk than it is placed in a location for readout of information from the upper side of the disk, and/or further below the underside of the disk than it is placed in a location for readout of information from the underside of the disk.

Thus, it is particularly necessary to take measures to prevent the (upper) head and the head arm from interfering with the other member (an upper cover, for instance) located above the upper head and the head arm, and/or preventing the (lower) head and the head arm from interfering with the other member (the frame plate, particularly) located below the lower head and the head arm, when the head and the head arm are in the standby position within the thin case body.

Further, the head for readout and writing of information from and to the disk is housed in a narrow space in the case body in close proximity to other components, and is therefore easily affected by electromagnetic noise originating from the elements mounted on the circuit substrate or a magnetic field generated from a stator coil as one of constituents of a disk drive motor, resulting in head reading/writing malfunctions.

DISCLOSURE OF THE INVENTION

It is an object of the present invention to secure a space, which is sufficient to permit a magnetic recording/reproducing head mounted on a head arm to be moved between a recording/reproducing position to obtain access of the head to a disk-shaped recording medium loaded in the device and a standby position to place the head in a location distant from the disk-shaped recording medium without interference of the head with other members arranged in the device, in a card-type magnetic recording device having dimensions regulated to meet the standard. Another object is to provide a means of preventing the magnetic recording/reproducing head from being affected by electromagnetic noise and a magnetic field originating from other components or elements close to each other in a limited space.

To attain the above objects, a card-type magnetic recording device according to the present invention comprises a disk housing space for housing a disk-shaped recording medium; a head arm carrying a magnetic recording/reproducing head and causing the magnetic recording/reproducing head to move between a recording/reproducing position to obtain access to the disk-shaped recording medium loaded in the disk housing space and a standby position at a distance from the disk-shaped recording medium; a frame plate which mounts the head arm and a disk drive device for driving the disk-shaped recording medium loaded in the disk housing space, on one surface thereof; and a circuit substrate, located on the other surface of the frame plate in overlap arrangement, having a plurality of elements arranged on the surface opposite to the surface facing the frame plate; wherein the frame plate has an opening or a concave part allowing the magnetic recording/reproducing head placed in the standby position and/or a part of the head arm to be housed therein. Thus, the magnetic recording/reproducing head can be moved between the standby position and the recording/reproducing position without interfering with the frame plate.

The opening formed in the frame plate having a thickness of 0.4 mm permits the magnetic recording/reproducing head placed in the standby position to be lowered further by about 0.4 mm. On the other hand, while the concave part may be formed in the frame plate by reducing the thickness of a part of the frame plate, the permissible length to lower the magnetic recording/reproducing head is limited in this case. However, the concave part formed by projecting the frame plate by means of drawing or the like increases the permissible length to lower the magnetic recording/reproducing head more than that in the above case.

According to one mode of the card-type magnetic recording device according to the present invention, the head arm is composed of an upper arm which carries the magnetic recording/ reproducing head to gain access to the upside of a disk-shaped recording medium and a lower arm carrying the recording/reproducing head to gain access to the underside of the disk-shaped recording medium. Then, a part of the lower head arm and/or the head mounted on the arm may be housed in the opening or the concave part formed in the frame plate, and the distance between the magnetic recording/reproducing head mounted on the upper arm and the magnetic recording/reproducing head mounted on the lower arm in this state is made wider than the distance between the above magnetic recording/reproducing heads placed in the recording/reproducing position.

An electromagnetic shield material such as copper foil is adhered to the surface opposite to the circuit substrate in the frame plate using an adhesive so as to cover the opening. In this case, the copper foil has a thickness of about 40 $\mu$m, and the adhesive has a thickness of about 30 $\mu$m.

Instead of forming the opening, a concave part may be formed by reducing the thickness of a part of the frame plate. The portion having a reduced thickness is also used for the electromagnetic shield material.

Any digital IC is not arranged in a magnetic recording/ reproducing head operation area and its neighborhood area on the circuit substrate, but an analog IC can be arranged in the above areas. Thus, noise originating from the digital IC can be prevented from having an effect on the magnetic recording/reproducing head. The magnetic recording/ reproducing head is hardly affected by the analog IC.

Further, the disk drive device is a motor, and a stator of the motor is composed of a plurality of winding parts formed by winding a plurality of cores with coils. However, a core placed in a location corresponding to the magnetic recording/reproducing head operation area is exposed to the outside without being wound with a coil. Thus, the magnetic recording/reproducing head can be prevented from being affected by magnetic noise originating from the winding parts.

BEST MODE OF EMBODYING THE INVENTION

Figure 1:
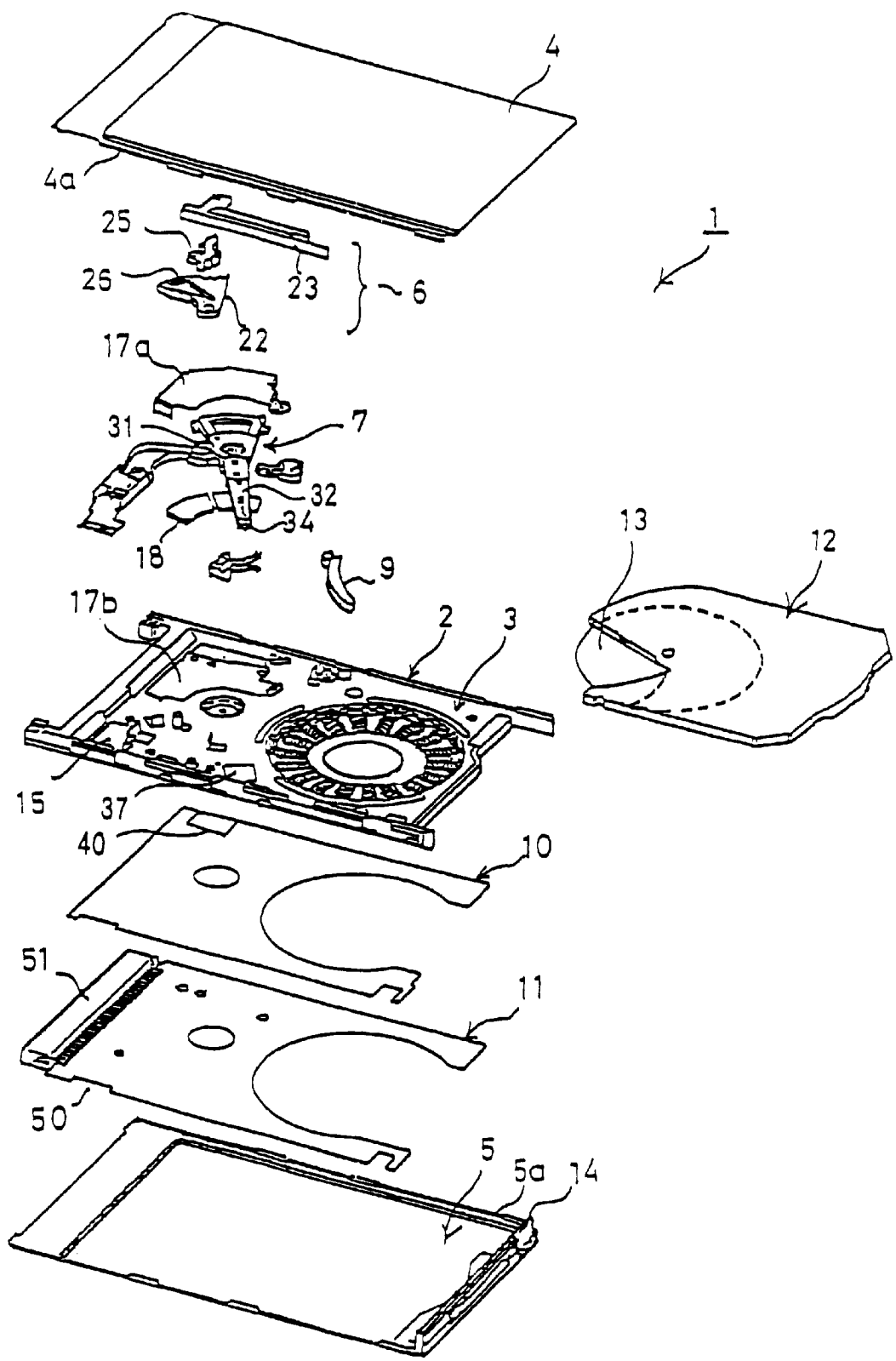
FIG. 1 is an exploded view showing a card-type magnetic recording device in the first embodiment according to the present invention.

A description will now be given of the outline of a card-type magnetic recording device 1 according to the present invention with reference to FIGS. 1 to 4A.

An upper cover 4 and a lower cover 5 are provided as a molded product obtained by pressing a thin SUS plate and are mounted on a frame 2 in one united body by engaging the opposite sides of the covers 4 and 5 to the frame 2 from outside, providing a case body of the card-type magnetic recording device 1. The size of the case body, that is, dimensions (width×length×thickness) of the card-type magnetic recording device 1 are based on PCMCIA standard type II to be 54.0 mm in width, 85.60 mm in length and 5.0 mm or less in width. Further, each of lower stage parts 4a, 5a at the left and right sides of the upper and lower covers 4, 5 has a width of not less than 3.0 mm, and a distance between the lower stage part 4a of the upper cover 4 and the lower stage part 5a of the lower covers 5 is set to be 3.30 mm.

Further, a frame plate 3 is provided as a molded product obtained by pressing a stainless steel plate (SUS plate) and are outsert-molded together with the synthetic resin frame 2 in one united body, providing the structural and strength foundations of the card-type magnetic recording device 1.

An insulating sheet 10 and a circuit substrate 11 are housed in the case body, in addition to the frame plate 3.

Various components such as a main ejector mechanism 6, a sub ejector mechanism 9, a magnetic recording/ reproducing head body 7 and a disk drive motor 8 are mounted on the upside of the frame plate 3.

A cartridge 12 having a magnetic recording disk 13 housed therein is inserted into the card-type magnetic recording device 1. Further, the cartridge 12 inserted into the card-type magnetic recording device 1 is ejected to the outside of the device through the operation of the main ejector mechanism 6 and the sub ejector mechanism 9.

The lower cover 5 as one of the constituents of the case body has a shutter 14. The shutter 14 is urged by the action of a spring to be held in a rising state at all times. On the other hand, the shutter 14 falls down through forward pivotal motions about the lower end when pressed by the end of the cartridge 12.

Figure 3:
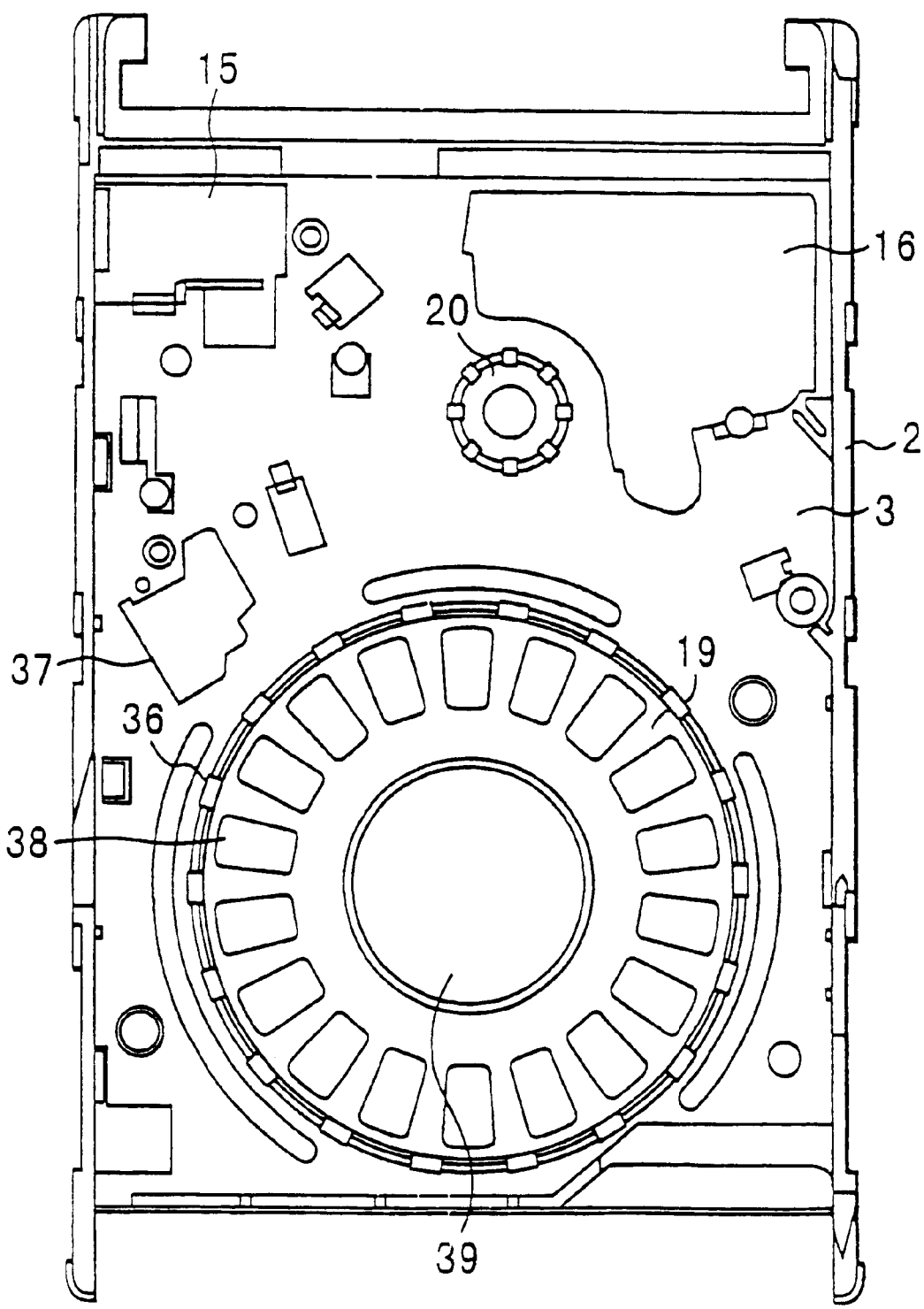
FIG. 3 is a plan view showing a frame plate in the card-type magnetic recording device of FIG. 1 as seen from the outside, together with a frame mounted on the frame plate in one united body.
Figure 4A:
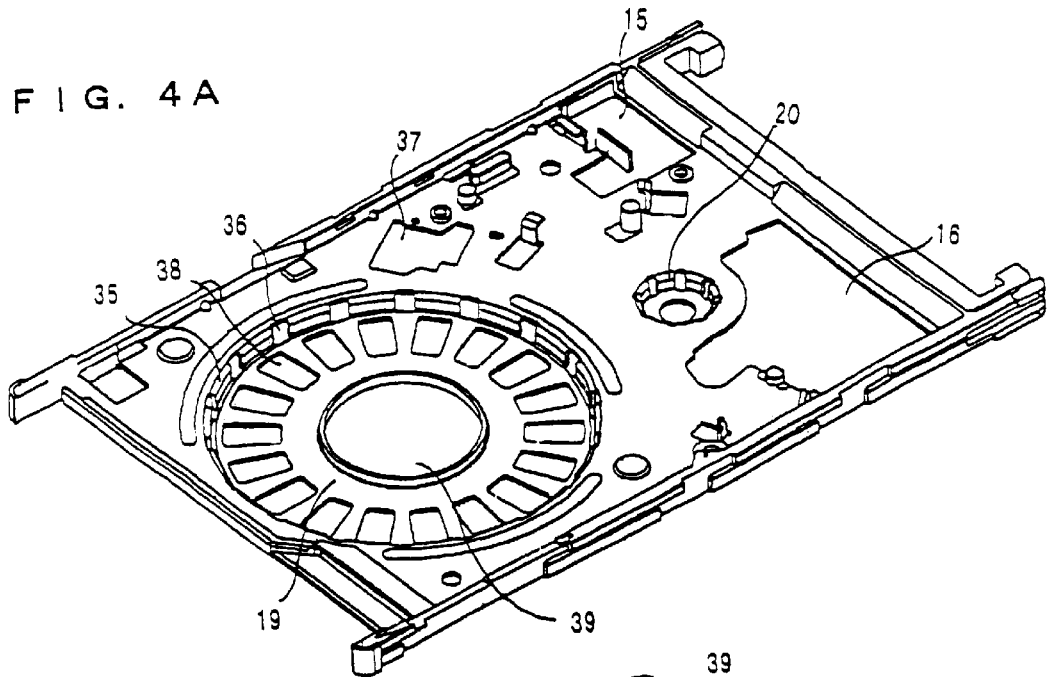
FIG. 4A is a perspective view showing the frame plate of FIG. 3 as seen from the inside.

A description will now be given of the frame plate 3 with reference to FIG. 3 showing the underside of the frame plate and FIG. 4A showing the upside thereof.

A cut-out hole 15 is formed at one side (the left side in FIG. 3) of a front part of the frame plate 3, and a mounting hole 15 is formed at the other side (the right side in FIG. 3) thereof. The cut-out hole 15 is used for holding a FPC 61 (see FIG. 2). An upper yoke 17a, a lower yoke 17b and a stator magnet 18 as constituents of the magnetic recording/ reproducing head body 7 (see FIG. 1) are mounted in the mounting hole 16.

Further, a concave part 20 for mounting a pivotal axis 21 (see FIG. 2) of the magnetic recording/reproducing head body 7 is formed in the front part of the frame plate 3 at an approximately intermediate position between the cut-out hole 15 and the mounting hole 16.

On the other hand, a concave part 19 having a circular cross-sectional shape for mounting the disk drive motor 8 is formed in a rear part of the frame plate 3 by means of drawing, as shown in FIG. 4A. A hole 39 for mounting a bearing (not shown) of the disk drive motor 8 is formed in the center of the bottom surface of the concave part 19.

Then, a plurality of (18 pieces in FIGS. 3 and 4A) coil mounting slots 38 extending from the center of the center hole 39 in a radial direction are formed in the bottom surface of the concave part 19.

The disk drive motor 8 is composed of a stator 45 and a rotor 44. The stator 45 has radially-extending magnetic cores (not shown) as many as (eighteen pieces) the coil mounting slots 38 in locations around the axis of rotation of the rotor 44. The eighteen pieces of coil winding parts 45d are formed by winding each of the eighteen pieces of cores with coil wires a predetermined number of turns. These coil winding parts 45d are placed in locations corresponding to the eighteen pieces of coil mounting slots 38 formed in the bottom surface of the concave part 19.

Further, as shown in FIG. 4A, open holes 36 as many as the coil mounting slots 38 are formed in a peripheral wall 35 of the concave part 19 in locations corresponding to the middles of the adjacent slots 38 in the bottom surface of the concave part 19. These open holes 36 are for relief of stress resulting from a process of drawing, and it is necessary to form the open holes in a material of a flat frame plate 3 before being subjected to drawing. Incidentally, each open hole 36 may extend from the peripheral wall 35 of the motor-mounting concave part 19 to the bottom surface of the concave part 19 (to the middle between the adjacent slots 38).

On the other hand, the rotor 44 has a ring-shaped permanent magnet 46, which attracts a hub of the magnetic recording disk 13 housed in the cartridge 12.

Further, various projecting parts functioning as axes and anchor parts of other components mounted on the frame plate 3 are formed on the upside of the frame plate 3.

A description will now be given of the main ejector mechanism 6 and the sub ejector mechanism 9 mounted on the upside of the frame plate 3 with reference to FIGS. 1 and 2.

When the cartridge 12 is inserted into the card-type magnetic recording device 1, the main ejector mechanism 6 locks the inserted cartridge 12 in the card-type magnetic recording device 1. On the other hand, when the cartridge 12 is again pushed forward a little, the main ejector mechanism 6 releases the cartridge 12 from its locked state to eject the cartridge 12 to the rear.

The main ejector mechanism 6 comprises a cam plate 22, a slider 23, an ejector spring 24 and an engagement gear 25. The cam plate 22 is supported on the frame plate 3 in a manner such that it can turn about an axis and is urged at all times so that it swings clockwise as shown in FIG. 2. Further, a grooved cam 26 is formed on one surface of the cam plate 22, and a gear 27 is formed at the peripheral edge of the cam plate 22. A pin 28 at the front end of the slider 23 is engaged with the grooved cam 26.

When the cartridge 12 is pushed in the card-type magnetic recording device 1 through the opening at the rear, the slider 23 is pressed forward, the main ejector mechanism 6 is locked, and the shutter 14 of the cartridge 12 is then opened to thereby permit the magnetic recording disk 13 to be loaded in the card-type magnetic recording device 1.

The gear 27 of the cam plate 22 meshes with the engagement gear 25 supported on the frame plate 3 in a manner such that it can rotate about an axis. The engagement gear 25 also has a projecting portion 29, in addition to a gear part.

Figure 2:
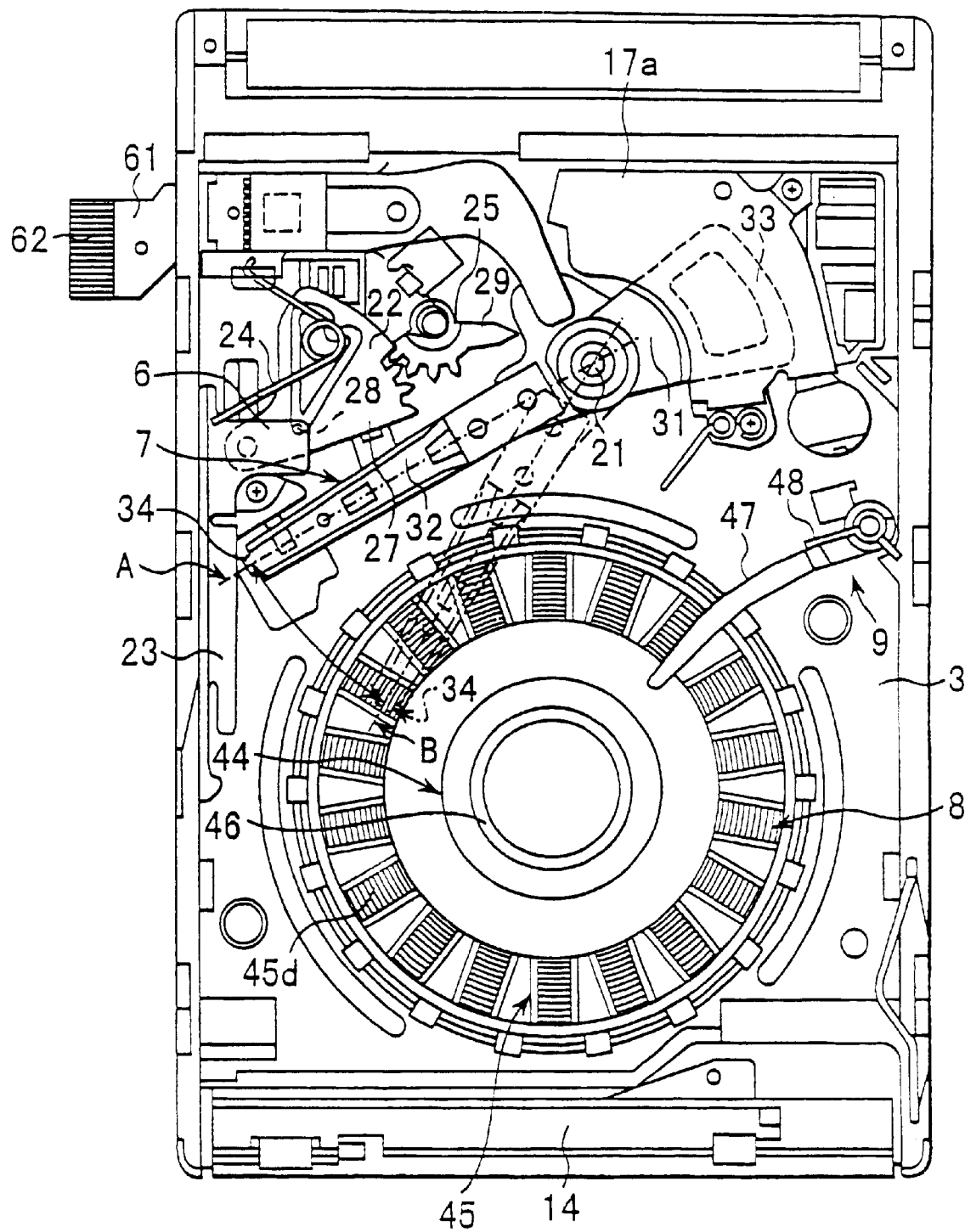
FIG. 2 is a plan view showing the inside of the card-type magnetic recording device of FIG. 1 with an upper cover removed.

The slider 23 is arranged on the inside of one side (the left side in FIG. 2) of the frame 2 slidably, as shown in FIG. 2.

The sub ejector mechanism 9 has a lever 47 mounted on the frame plate 3 so that it can swing about an axis, a first return spring 48 for urging the lever to the rear (toward the ejecting direction of the cartridge) and a second return spring (not shown) subjected to accumulation of energy when the lever 47 is moved forward, as shown in FIG. 2. The sub ejector mechanism 9 permits the lever 47 urged by the first return spring 48 and the second return spring to push out the cartridge 2 to the rear in cooperation with the main ejector mechanism 6 when the cartridge 12 is released from its locked state.

A description will now be given of the magnetic recording/reproducing head body 7 mounted on the upside of the frame plate 3 with reference to FIGS. 1 and 2.

The magnetic recording/reproducing head body 7 comprises a resin base body part 31, a head arm 32, a drive coil 33 and a magnetic recording/reproducing head (which will be hereinafter referred to as a head) 34 mounted on the end of the head arm 32.

The drive coil 33 and the head arm 32 are respectively fixed to the opposite sides of the base body part 31 in one united body. The magnetic recording/reproducing head body 7 is mounted on the frame plate 3 as being freely pivoted about a pivotal axis 21 arranged in the center of the base body part 31 (that is, a position of center of gravity of the whole magnetic recording/reproducing head body 7). A power lead wire (not shown) connected to the drive coil 33 and a signal lead wire (not shown) connected to the head 34 are connected to the base body part 31.

The head arm 32 swings about the pivotal axis 21 so that the head 34 moves between a first position A (a standby position shown by a solid line in FIG. 2) where the head 34 is isolated from the magnetic recording disk (hereinafter referred to as disk) 13 in the radial direction as well as in the direction of disk rotation axis and a second position B (a recording/reproducing position shown by a broken line in FIG. 2) where the head comes closer to the surface of the disk 13 in consequence of movement from the first position A in the radial direction of the disk 13 as well as in the direction of the disk rotation axis. An angle between the first position A and the second position B is about 30 degrees. Further, the head arm 32 slides in the radial direction of the magnetic recording disk 13 to gain access to the magnetic recording disk 13 in the second position B (the recording/reproducing position).

A description will now be given of the circuit substrate 11.

The circuit substrate 11 has a power circuit, an information processing circuit, and electric elements such as a switching circuit, an amplifying circuit, a CPU and a memory (see FIG. 5) required for the above power circuit and the information circuit on the base formed mainly by a resin. The circuit substrate 11 is arranged on the underside of the frame plate 3 through the insulating sheet 10. The insulating sheet 10 is adapted to eliminate troubles of direct contact of various projection parts existing on the upside of the circuit substrate 11 with the frame plate 3.

The electronic element 41 is arranged on the (underside) surface of the circuit substrate 11 opposite to the insulating sheet 10. An external connection connector 51 meeting PCMCIA standard is mounted on the circuit substrate 11 along the front edge of the circuit substrate 11.

Power is supplied to the disk drive motor 8 fixed to the motor concave part 19 of the frame plate 3 through a connector (not shown) provided on the underside of the circuit substrate 11. A signal from the magnetic recording/reproducing head body 7 of which pivotal axis 21 is fitted to the axis mounting concave part 20 of the frame plate 3 is given to a connector (not shown) provided on the underside of the circuit substrate 11 through a signal line. Further, power is supplied from a connector (not shown) provided on the underside of the circuit substrate 11 to the magnetic recording/reproducing head body 7 through a power line. The signal line and the power line for connection between the circuit substrate 11 and the magnetic recording/reproducing head body 7 are put together in the FPC 61. A notch part 50 to allow the FPC 61 to pass is formed at one side end of the circuit substrate.

A description will now be given of the first embodiment of the present invention in more detail with reference to FIGS. 4B to 6.

In the first embodiment, the head arm 32 is composed of an upper arm 32a gaining access to the upside of the magnetic recording disk 13 and a lower arm 32b gaining access to the underside of the magnetic recording disk 13. Thus, the heads 34 are mounted on the upper arm 32a at the end thereof and also on the lower arm 32b at the end thereof, respectively, as shown by reference numerals 34a, 34b.

Figure 5:
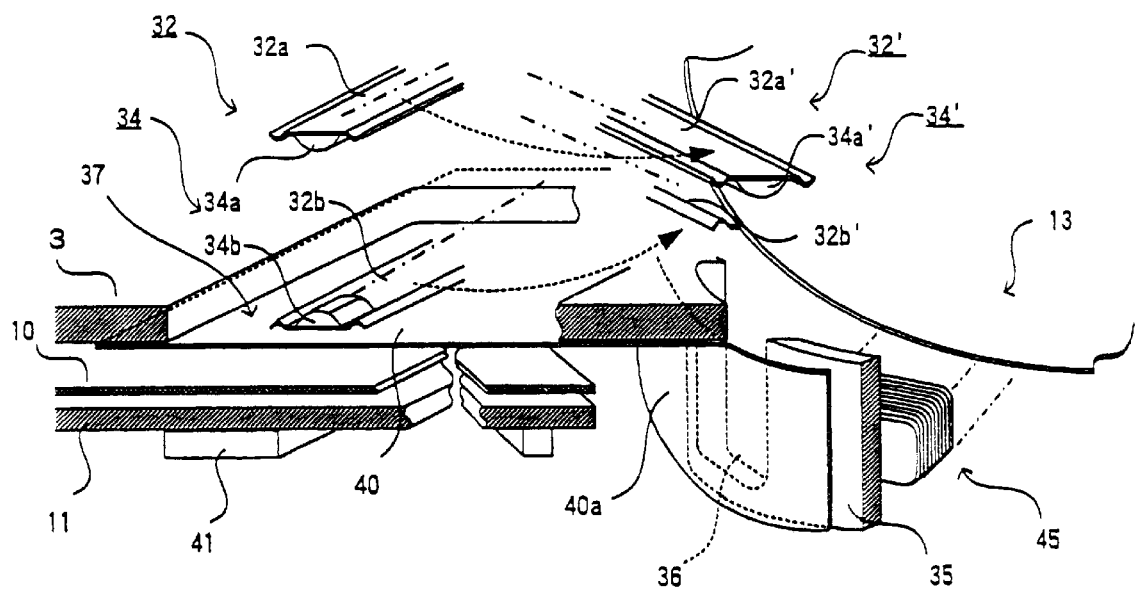
FIG. 5 is a perspective view (partly in section) for illustrating a structure in which the frame plate of the card type magnetic recording device of FIG. 1 has an opening in a location facing a head standby position and this opening is covered with an electromagnetic shield.
Figure 6:
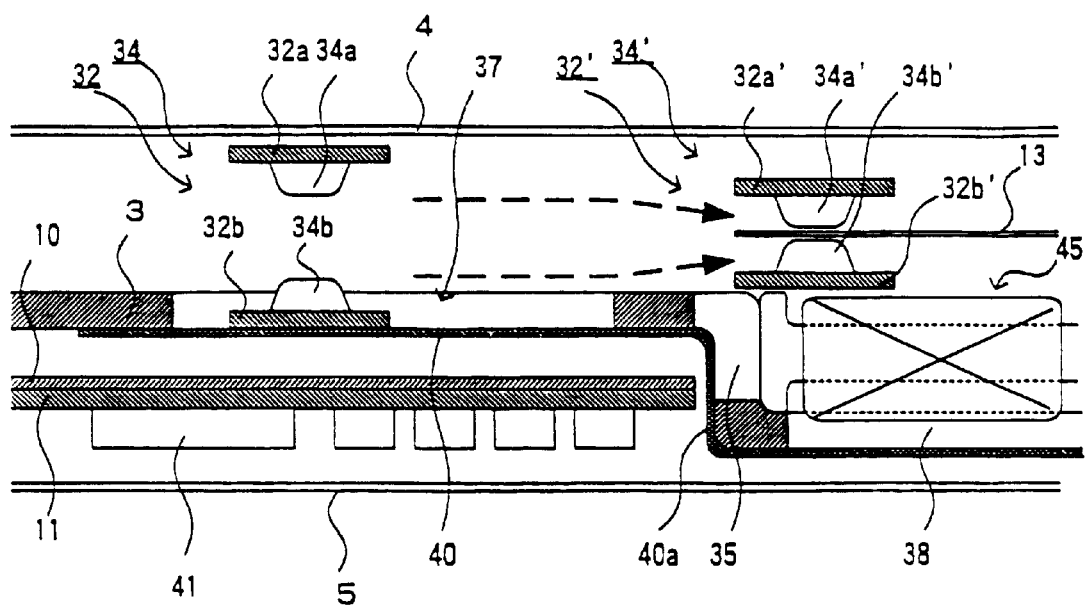
FIG. 6 is a sectional view corresponding to the perspective view of FIG. 5.

FIGS. 5 and 6 show the state where the upper arm 32a and the lower arm 32b as constituents of the head arm 32 together with the heads 34a, 34b mounted to the ends of the arms 32a, 32b are in a standby position (corresponding to the position A in FIG. 2). These arms and heads in the recording/reproducing position (corresponding to the position B in FIG. 2) are shown in FIGS. 5 and 6 by putting "'" on the corresponding reference numerals for indicating that they are positioned in a recording/reproduction position. That is, in FIGS. 5 and 6, the arm 32' (the upper arm 32a' and the lower arm 32b') and the heads 34a' and 34b' mounted on the ends of the arms 32a', 32b' indicate that they these arms and heads are positioned in the recording/reproducing position.

As is apparent from FIGS. 5 and 6, the distance between the upper arm 32a and the lower arm 32b on standby (or between the heads 34a and 34b on standby) is made wider (in an open state) than the distance between the upper arm 32a' and the lower arm 32b' in process of recording/reproduction (or between the heads 34a', 34b' on standby). This is because considerations are made to move the head arm 32 on standby to the recording/reproducing position by taking the actions of lowering the upper arm 32a from a position above the magnetic recording disk 13 toward the upside of the magnetic recording disk 13, while raising the lower arm 32b from a position below the magnetic recording disk 13 toward the underside of the magnetic recording disk 13.

An opening 37 (see FIG. 4A) for housing the lower arm 32b and the head 34b mounted on the end of the lower arm 32b is formed in the frame plate 3 such that the upper and lower arms 32a, 32b placed in the open state in the standby position can be housed in the card-type magnetic recording device 1 having the dimensions regulated to meet PCMCIA Type II standard.

As a result, when the head arm 32 is in the standby position, the end of the lower arm 32b is housed in the opening 37 formed in the frame plate 3 without being placed on the frame plate 3, as shown in FIG. 6. In consequence, the head arm 32 can hold its open state in the card-type magnetic recording device 1 having a thickness regulated to meet the above standard.

In movement of the head 34 placed in the standby position to the recording/reproducing position, the upper arm 32a and the lower arm 32b as constituents of the head arm 32 moves to the positions (the recording/reproducing positions) shown by reference numerals 32a', 32b' in FIGS. 5 and 6, while being guided by a guide mechanism (not shown) in a direction of coming closer to the magnetic recording disk 13 as shown by dotted lines with arrows in FIGS. 5 and 6.

While the opening 37 is formed in the frame plate 3 to eliminate the interference of the lower arm 32b of the head arm 32 with the frame plate 3 as shown in FIGS. 5 and 6, a concave part may be formed, instead of the opening 37, if a reduction in thickness of a part of the frame plate 3 (that is, formation of the concave part) makes it possible to prevent the lower arm 32b from interfering with the frame plate 3. As described above, either forming an opening in the frame plate 3 or a concave part by locally reducing the thickness of the frame plate can prevent the head arm 32 from interfering with the frame plate 3.

When the opening 37 is formed in the frame plate 3, the electromagnetic noise originating from the electronic element 41 mounted on the circuit substrate 11 arranged on the underside of the frame plate 3 through the insulating sheet 10 reaches the head 34 (34a, 34b) placed in the standby position through the opening 37 and as a result, has an effect on the head. To avoid the above situation, it is necessary to cover the opening 37 formed in the frame plate 3 with an electromagnetic shield material 40 adhered to the underside of the frame plate 3 with an adhesive, as shown in FIG. 4A. Since the opening 37 of the frame plate 3 is covered with the electromagnetic shield material 40, the electromagnetic noise originating from the electronic element 41 mounted on the circuit substrate 11 may be restrained from reaching the head 34 (34a, 34b) through the opening 37.

Figure 4B:
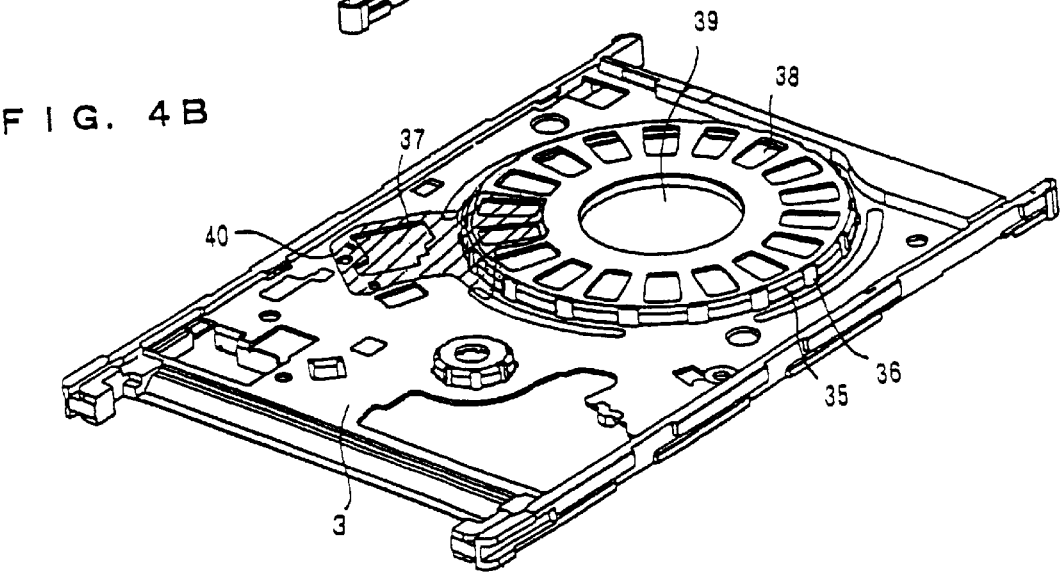
FIG. 4B is a perspective view showing the frame plate of FIG. 4A as seen from the outside.

Incidentally, the electromagnetic shield material 40 may extend toward the concave part 19 for mounting the disk drive motor, formed in the frame plate 3, to cover one or more (two in the embodiment in FIG. 4B) open holes 36 near the head 34 (34a, 34b) among the eighteen pieces of open holes 36 formed in the peripheral wall of the concave part 19, as shown in FIGS. 4B, 5 and 6. Also, the electromagnetic shield material 40 may extend therefrom to cover one or more (two in the embodiment in FIG. 4B) coil mounting slots 38 near the head 34 (34a, 34b) among the eighteen pieces of coil mounting slots 38.

FIG. 4B shows an embodiment wherein an electromagnetic shield material 40a for covering the open holes 36, the electromagnetic shield material 40 for covering the opening 37 and the electromagnetic shield material 40 for covering the coil mounting slots 38 are formed in one united body. Instead of this structure, the above electromagnetic shield materials 40 may be formed individually.

As has been described above, the card-type magnetic recording device 1 according to the first embodiment of the present invention makes it possible to prevent the head arm 32 and the head 34 placed in the standby position from interfering with the frame plate 3 within the card-type magnetic recording device having a limited thickness, by forming the opening 37 in the part of the frame plate 3 or forming the concave part instead of the opening 37.

Further, the opening 37 formed in the frame plate 3 is covered with the electromagnetic shield material 40 so that the influence of the electromagnetic noise, originating from the circuit substrate 11 and passing through the opening 37, on the head 34 can be reduced.

Further, the coil mounting slots 38 formed in the frame plate 3 for arrangement of the stator coil 45 and the open holes 36 formed in the frame plate 3 for relief of stress resulting from a process of drawing for formation of the motor mounting concave part 19 may be covered with the electromagnetic shield material 40a, so that the influence of the noise, originating from the circuit substrate and passing through the slots 38 and the open holes 36, on the head 34 can be reduced.

A description will now be given of the outline of a card-type magnetic recording device 1 in the second embodiment according to the present invention with reference to FIGS. 7 and 8.

Figure 7:
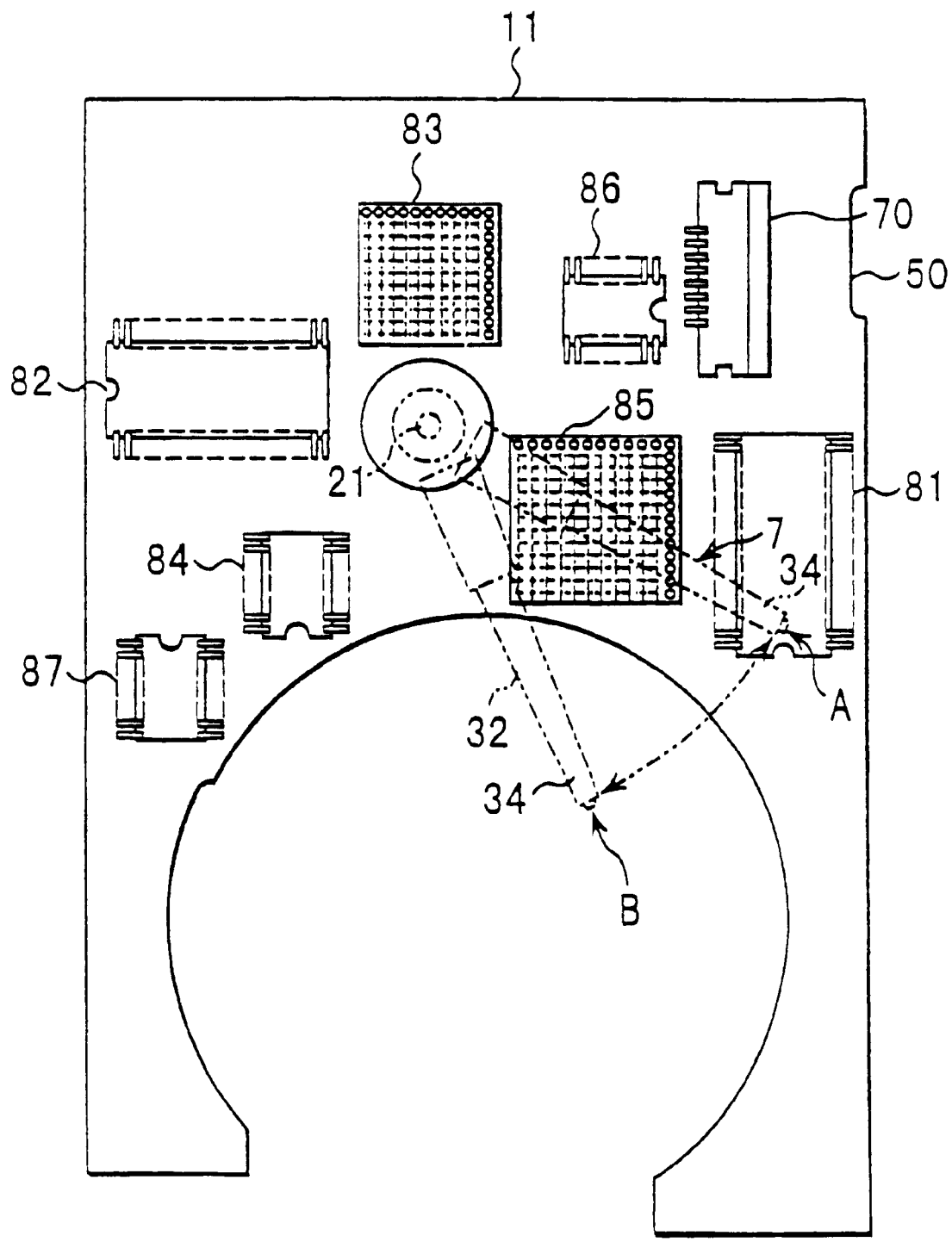
FIG. 7 is a plan view showing a card-type magnetic recording device in the second embodiment according to the present invention having various IC elements arranged on the element mounting surface of a circuit substrate.

As shown in FIG. 7, a connector 70 connected to a connector terminal 62 (see FIG. 2) formed at the end of the FPC 61 is mounted on the circuit substrate 11 in the proximity of a notch part 50. Further, essential ICs such as a read circuit analog IC 81, a motor drive IC 82 for controlling drive of the disk drive motor and the drive motor of the magnetic recording/reproducing head body 7, a logic IC 83 for converting a mode of a signal to and from external information equipment (not shown), a logic IC 84 for supporting the deficient functions of the logic IC 83, a MPU and a logic IC 85 for controlling the whole motions of the magnetic recording disk 13 for recording, reproduction and driving, a memory IC 86 for storing the basic software and a power supply IC 87 are mounted on the circuit substrate 11.

Among the above essential ICs, the read circuit analog IC 81 and the motor drive IC 82 are analog ICs, while the logic ICs 83, 84, the MPU and logic IC 85, the memory IC 86 and the power supply IC 87 are digital ICs,.

An imaginary line in FIG. 7 shows that the head 34, which is arranged above the circuit substrate 11, moves within an operation area between the first position A (corresponding to the position A in FIG. 2) and the second position B (corresponding to the position B in FIG. 2).

As shown in FIG. 7, it is a features of the second embodiment that considerations are made not to arrange any digital ICs in the operation area of the head 34 on the circuit substrate 11. This is because current supplied to the analog IC (ICs 81, 82) is several mV, whereas current supplied to the digital IC (ICs 83 to 87) is in the range of 0 to 5V, with the result that noise originates from the digital IC exclusively and has an effect on the head 34.

Figure 8:
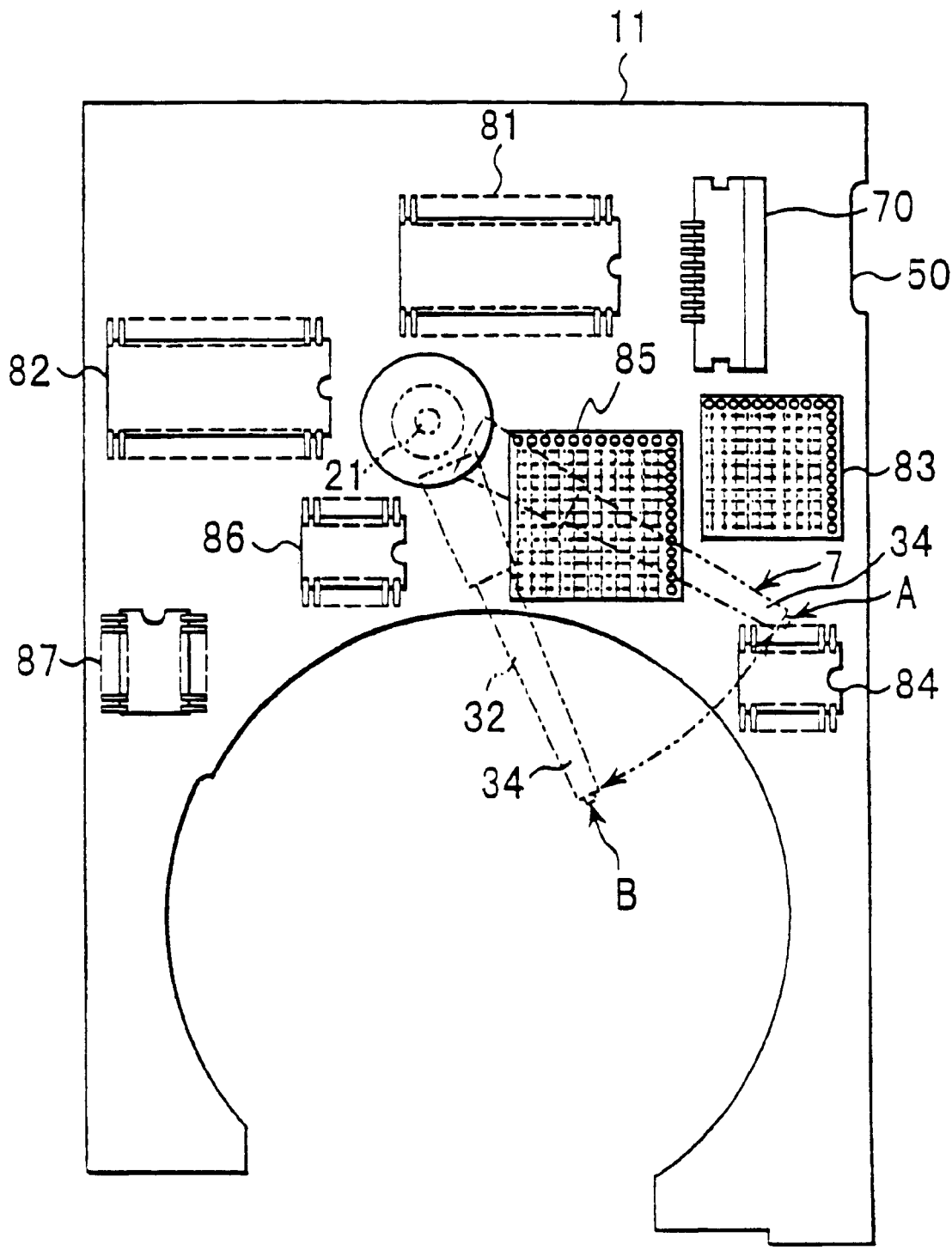
FIG. 8 is a view showing IC elements arrangement as a comparative embodiment for illustrating effects based on the arrangement of IC elements on the circuit substrate of FIG. 7.

Thus, if the arrangement of the essential ICs (ICs 81 to 87) is made as shown in FIG. 8, the noise originating from the logic IC 84 provided as the digital IC arranged in the operation area of the head 34 has an effect on the head, resulting in occurrence of errors in recording and reproduction to and from the magnetic recording disk 13.

In FIG. 7, the read circuit analog IC 81 is arranged in the operation area of the head 34 on the circuit substrate 11. This is because the IC 81 is an IC which operates in response to a feeble signal, and therefore, is affected by the noise if the IC 81 is arranged distant from the connector 70 to make a wiring pattern longer. For that reason, the IC 81 needs to be arranged close to the connector to prevent the IC 81 from being affected by the noise as much as possible.

As has been described above, the card-type magnetic recording device 1 in the second embodiment according to the present invention makes it possible to prevent the noise originating from the digital ICs from having an effect on the head 34 by arranging the digital ICs on the circuit substrate 11 outside the operation area of the head of the magnetic recording/reproducing head body. The analog ICs may be arranged in the operation area of the head 34 of the magnetic recording/reproducing head body on the circuit substrate 11.

A description will now be given of the outline of a card-type magnetic recording device 1 in a third embodiment according to the present invention with reference to FIG. 9.

In the above card-type magnetic recording device 1 shown in FIG. 2, the head 34 may be affected by the magnetic noise originating from one winding part 45d located close to the head 34 placed in the position B (the recording/reproducing position) in FIG. 2 among eighteen pieces of winding parts 45d forming the stator of the disk drive motor, resulting in hindrance of normal writing and readout operations.

For avoiding the above problem, it is well-known to project a flange from a member which supports a stator of a motor for driving a magnetic recording disk so as to separate the stator from the magnetic disk (and the magnetic head) and then adhere a magnetic shield thin plate consisting of a material of high magnetic permeability to the stator-side surface of the flange, forming a closed magnetic circuit with the stator, a rotor magnet facing the stator, a rotor holder for holding the rotor magnet, the stator and the flange. (Refer to Japanese Utility Model Publication No. 2-2066) However, the well-known technique has a disadvantage in that the magnetic shield thin plate consisting of the material of high magnetic permeability is expensive, and much labor is required for adhering the magnetic thin plate to a predetermined position of the flange.

According to the third embodiment, the problems with the above prior art are dissolved by providing a non-winding part C formed by winding no coil around one core 45e located close to the head 34 placed in the recording/reproducing position (the position B of FIG. 9) to expose the core 45e to the outside.

Figure 9:
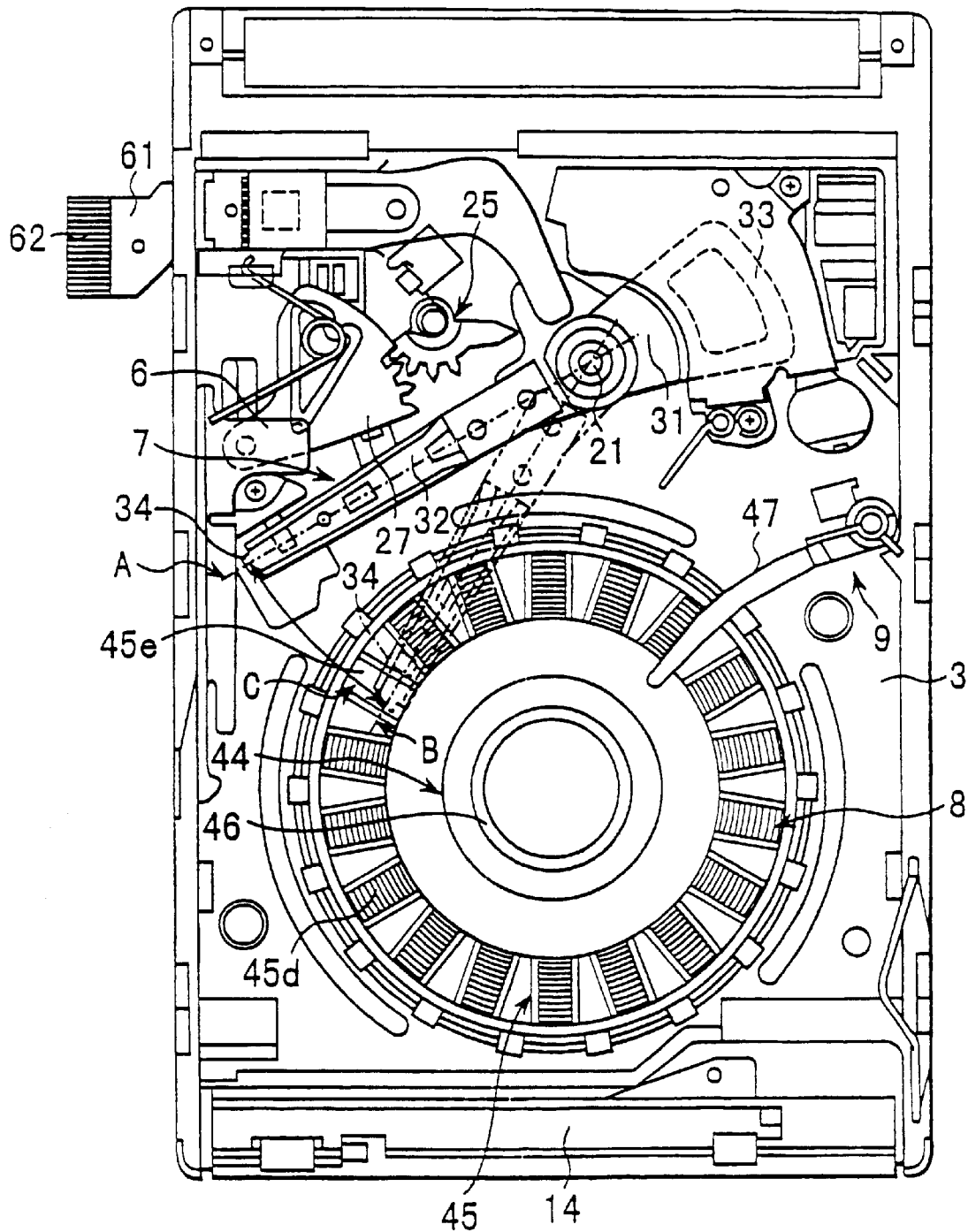
FIG. 9 is a plan view showing the inside of a card-type magnetic recording device in the third embodiment according to the present invention with an upper cover removed.

In FIG. 9, the head arm 32 makes swing motions about the pivotal axis 21 between the standby position (the position A shown by a solid line in FIG. 9) where the head 34 mounted on the end of the head arm takes retreat from the disk area and the recording/reproducing position (the position B shown by a broken line in FIG. 9) where the head 34 comes closer to the surface of the magnetic recording disk 13 for recording and reproduction, similarly to the head arm shown in FIG. 2.

Even if one of eighteen pieces of winding parts 45d forming the stator 45 of the disk drive motor 8 is made non-winding part C, driving of the disk drive motor 8 is hardly influenced.

According to the third embodiment, since the head may be protected from the influence of the magnetic noise originating from the winding parts 45d only by winding no coil around one of a plurality of cores, it is possible to provide a magnetic recording device which is available at a low cost and has a higher reliability in comparison with the prior art described above.

What is claimed is:

1. A card-type magnetic recording device comprising;
   a disk housing space for housing a disk-shaped recording medium;
   a head arm carrying a magnetic recording/reproducing head and causing the magnetic recording/reproducing head to move between a recording/reproducing position to obtain access to the disk-shaped recording medium loaded in said disk housing space and a standby position at a distance from the disk-shaped recording medium;
   a frame plate which mounts said head arm and a disk drive device for driving the disk-shaped recording medium loaded in said disk housing space, on one surface thereof; and
   a circuit substrate, located on the other surface of said frame plate in overlap arrangement, having a plurality of elements arranged on the surface opposite to the surface facing said frame plate;

wherein said frame plate has an opening or a concave part allowing the magnetic recording/reproducing head placed in said standby position and/or a part of the head arm to be housed therein, allowing the magnetic recording/reproducing head to move between the standby position and the recording/reproducing position without interference with said frame plate.

2. A card-type magnetic recording device according to claim 1, wherein said head arm is composed of an upper arm carrying the recording/reproducing head to gain access to the upside of the disk-shaped recording medium, and a lower arm carrying the recording/reproducing head to gain access to the underside of said disk-shaped recording medium, the part of the lower head arm and/or the head mounted on the arm is housed in the opening or concave part formed in the frame plate, and the distance between the magnetic recording/reproducing head mounted on the upper arm and the magnetic recording/reproducing head mounted on the lower arm in this state is made wider than the distance between said magnetic recording/reproducing heads placed in the recording/reproducing position.

3. A card-type magnetic recording device according to claim 1, wherein said opening is closed with an electromagnetic shield material by adhering it to the surface of the frame plate on the side opposite to the circuit substrate.

4. A card-type magnetic recording device according to claim 1, wherein an electromagnetic shield material is provided to close an open hole for relief of stress resulting from a process of drawing for formation of coil mounting slots in the frame plate for arrangement of a stator coil and/or a motor mounting concave part in the frame plate, on the side of the circuit substrate.

5. A card-type magnetic recording device according to claim 1, wherein an electromagnetic shield material is adhered to the surface of the frame plate opposite to the circuit substrate to cover said opening, and another electromagnetic shield material is provided, integral with the electromagnetic shield material, to close an open hole for relief of stress resulting from a process of drawing for formation of coil mounting slots in the frame plate for arrangement of the stator coil and/or a motor mounting concave part in the frame plate, on the side of the circuit substrate.

6. A card-type magnetic recording device according to claim 3 or 4, wherein said electromagnetic shield material is made of copper foil.

7. A card-type magnetic recording device according to claim 1, wherein a reduced thickness portion obtained by forming said concave part in the frame plate also serves as an electromagnetic shield material.

8. A card-type magnetic recording device according to claim 1, wherein digital ICs are arranged on the circuit substrate in an area other than an operation area from the recording/reproducing position to the retreat position and its neighborhood area, without arranging any digital ICs on the circuit substrate in the operation area of said magnetic recording/reproducing head and its neighborhood area.

9. A card-type magnetic recording device according to claim 8, wherein analog ICs are arranged on the circuit substrate in the operation area of said magnetic recording/reproducing head and its neighborhood area.

10. A card-type magnetic recording device according to claim 8, wherein said disk drive device is a motor provided with a stator having a plurality of winding parts formed by winding a plurality of cores with coils and a rotor driven by a revolving magnetic field generated in said stator, and the core or cores located in the operation area of said magnetic recording/reproducing head from the recording/reproducing position to the retreat position and its neighborhood area, among the plurality of cores, are not wound with coils.

11. A card-type magnetic recording device according to claim 10, wherein said core is made of a magnetic material and is formed to arrange radially about the axis of rotation of said rotor, and the core or cores wound with no coil, among said cores, are exposed to the outside.

* * * * *